United States Patent [19]

Trimble et al.

[11] 4,295,247
[45] Oct. 20, 1981

[54] GRIPPER-SEPARATOR DEVICE FOR CONTINUOUSLY SHIRRED CASINGS

[75] Inventors: Roy L. Trimble, Theodosia, Mo.; Alfred D. Story; Harold H. Martinek, both of Danville,, Ill.

[73] Assignee: Teepak, Inc., Chicago, Ill.

[21] Appl. No.: 147,768

[22] Filed: May 8, 1980

[51] Int. Cl.³ .............................................. A22C 13/02
[52] U.S. Cl. ........................................ 17/1 R; 17/41; 17/49; 53/581
[58] Field of Search ..................... 17/41, 42, 49, 1 R; 53/581

[56] References Cited

U.S. PATENT DOCUMENTS 3,942,221 3/1976 Sipusic et al. .......................... 17/42

Primary Examiner—Willie G. Abercrombie
Attorney, Agent, or Firm—Charles E. Brown

[57] ABSTRACT

This relates to a gripper-separator unit for separating continuously shirred casing into individual strands. The gripper is provided with hold back blades which engage the shirred casing while the separator is provided with like blades which engage the shirred casing substantially in the same plane as the gripper blades. The separator is then rapidly moved away from the gripper so as to snap the casing at the point of engagement by the blades. Suitable drives are provided for separately reciprocating the gripper and the separator and various drives are provided for positioning the blades. When the casing is being spun, the separator and the gripper are spun in unison therewith.

24 Claims, 22 Drawing Figures

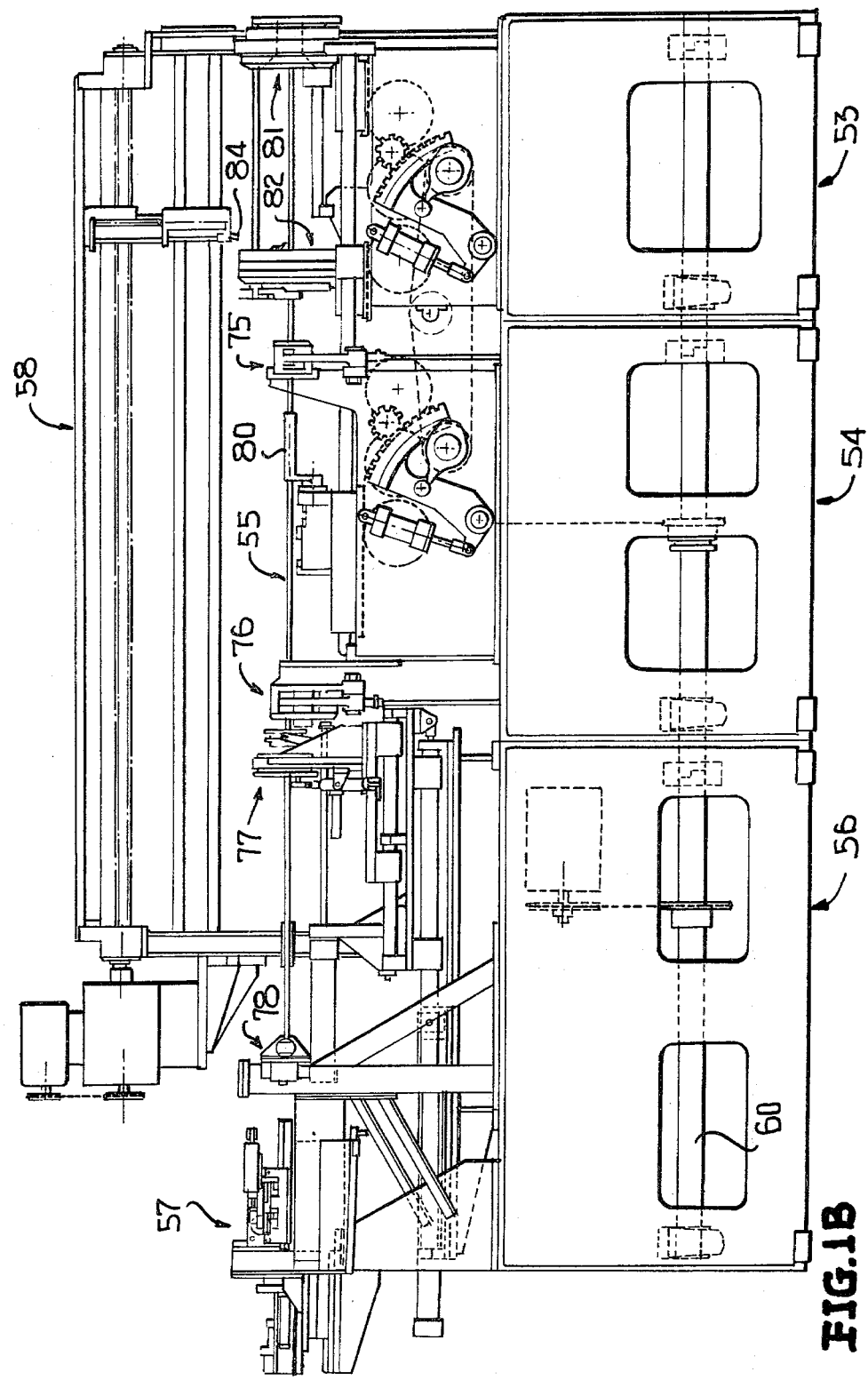

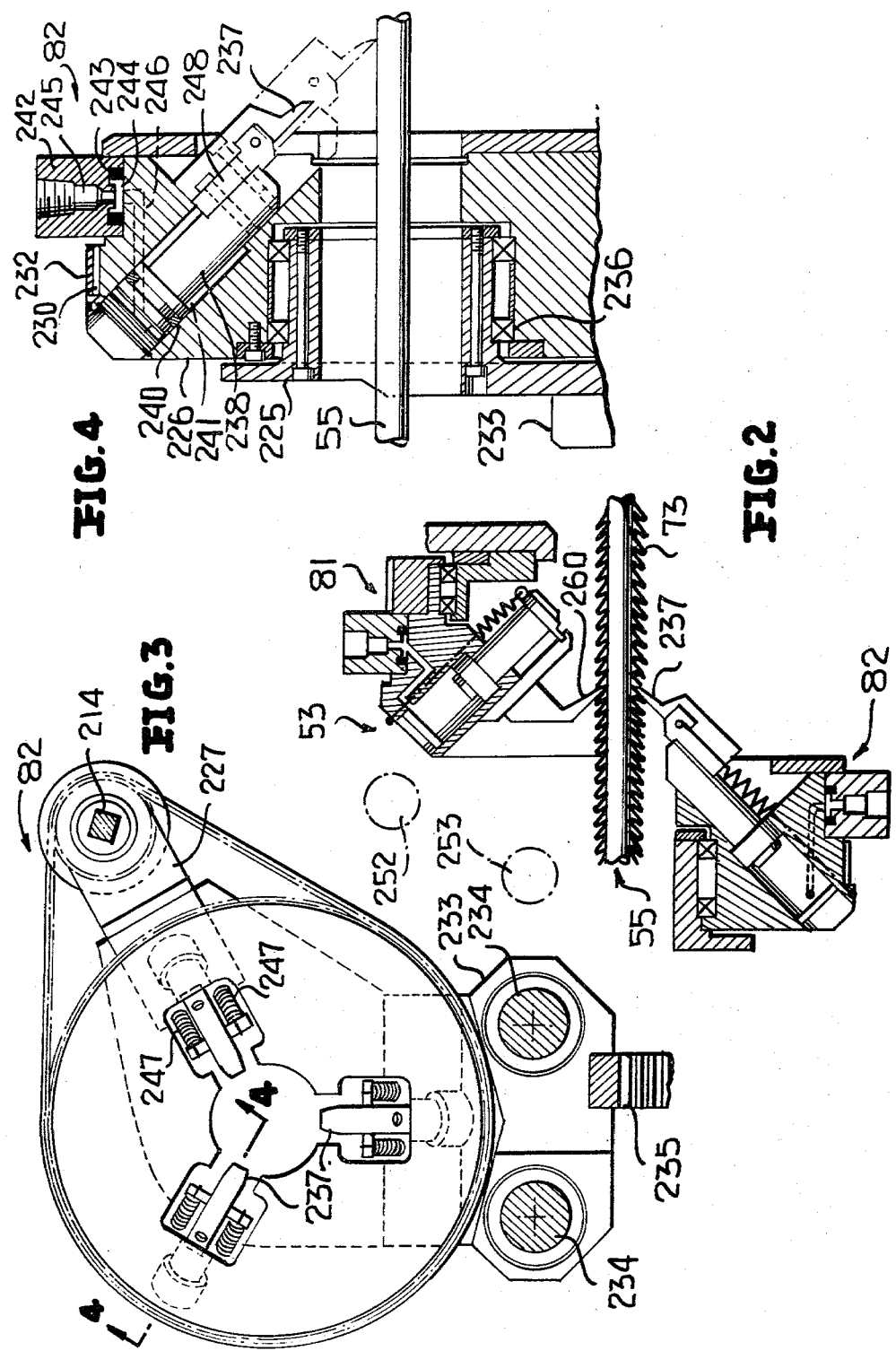

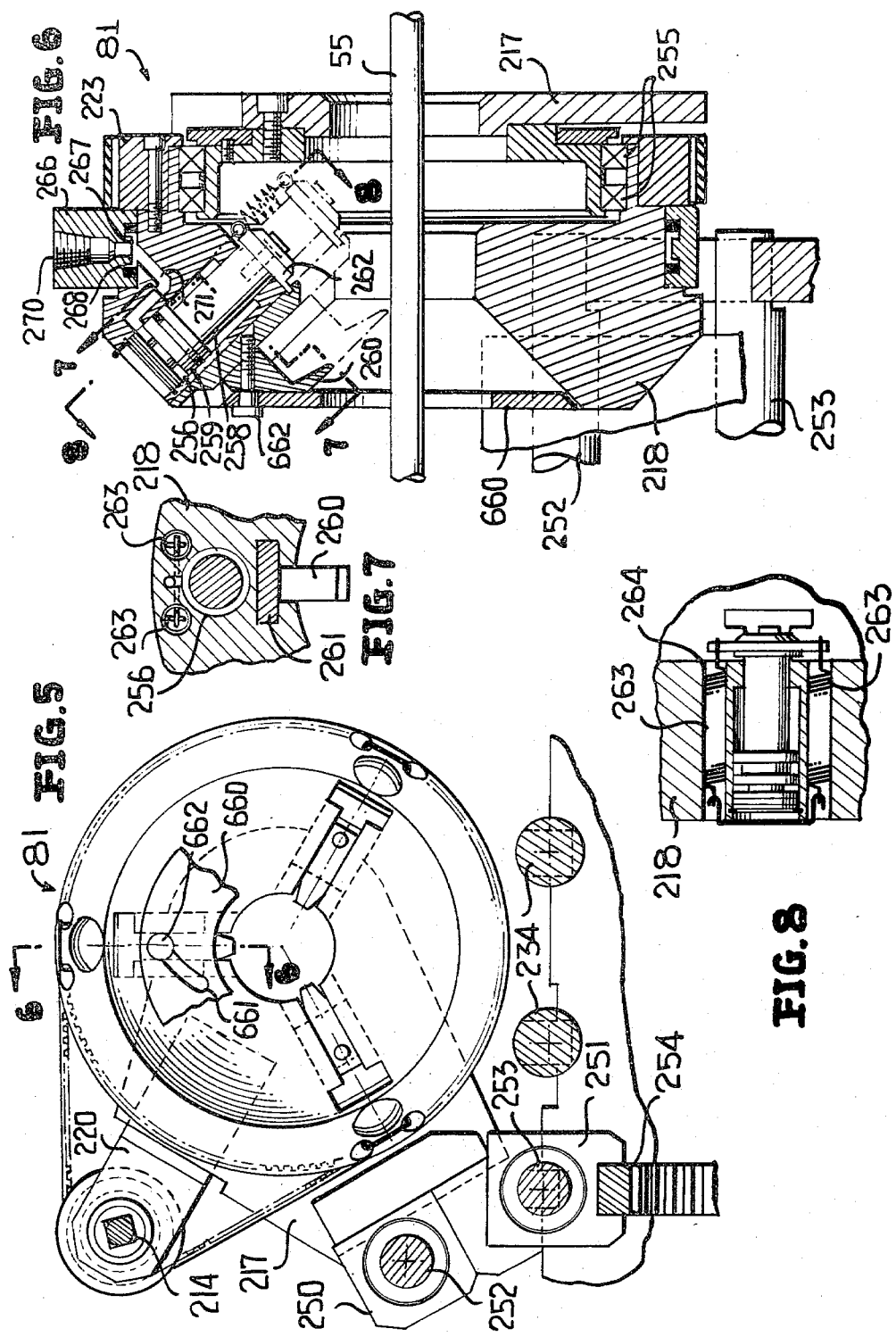

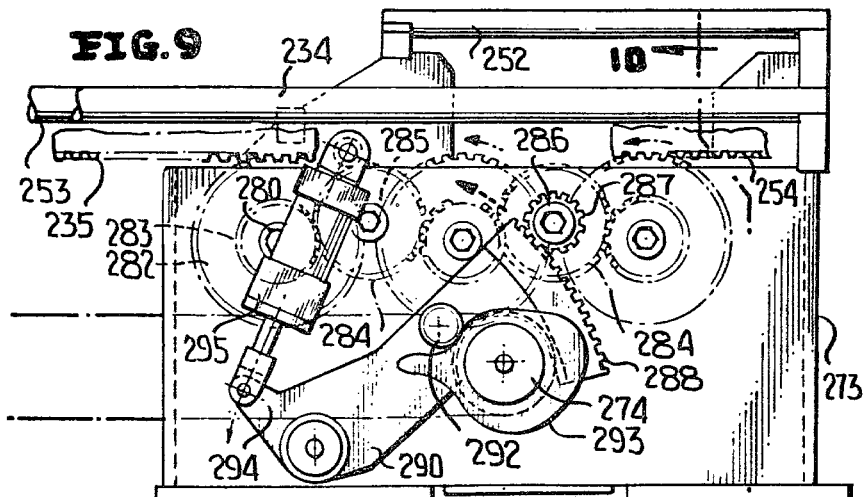
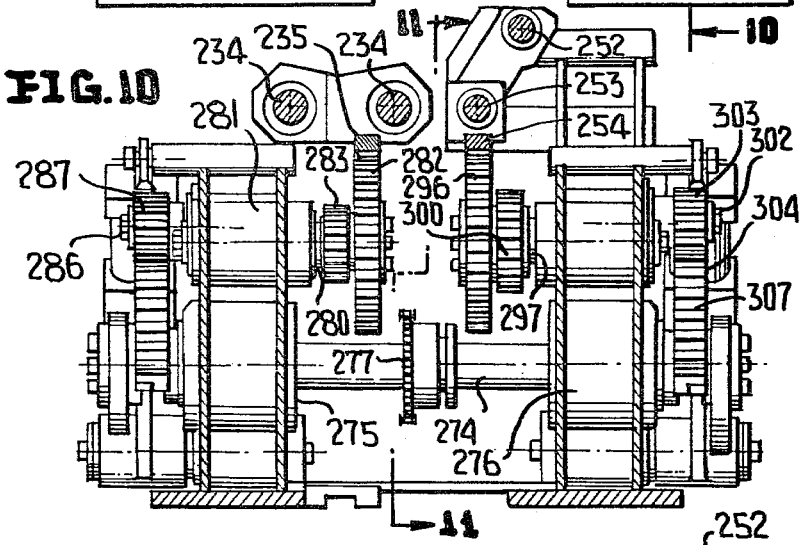
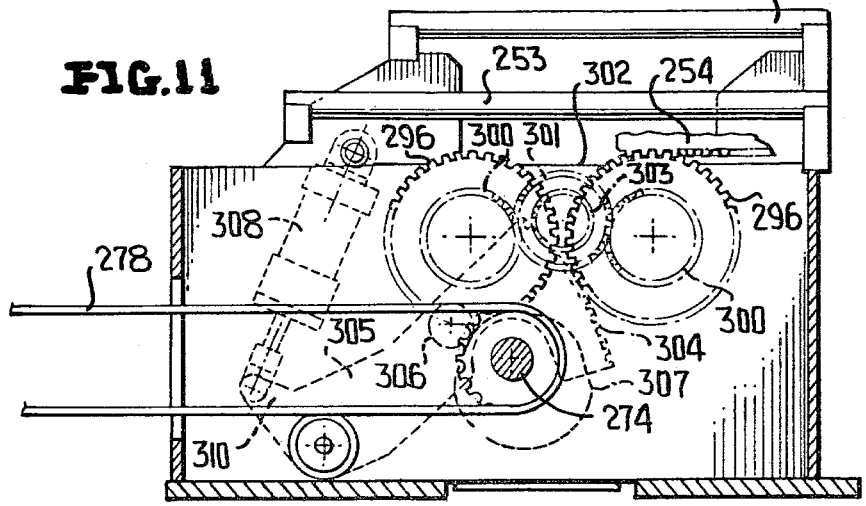

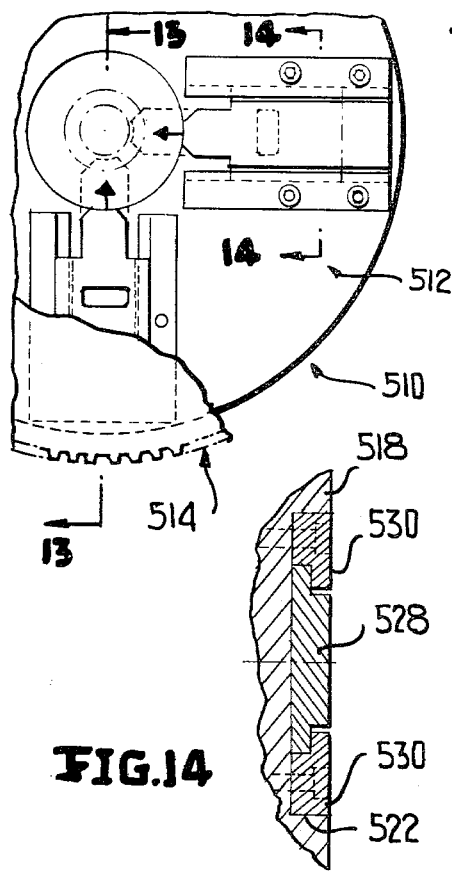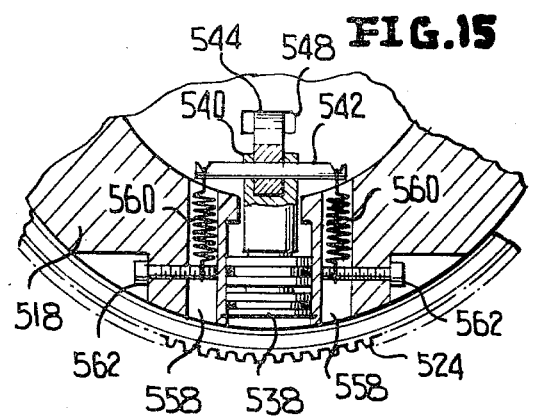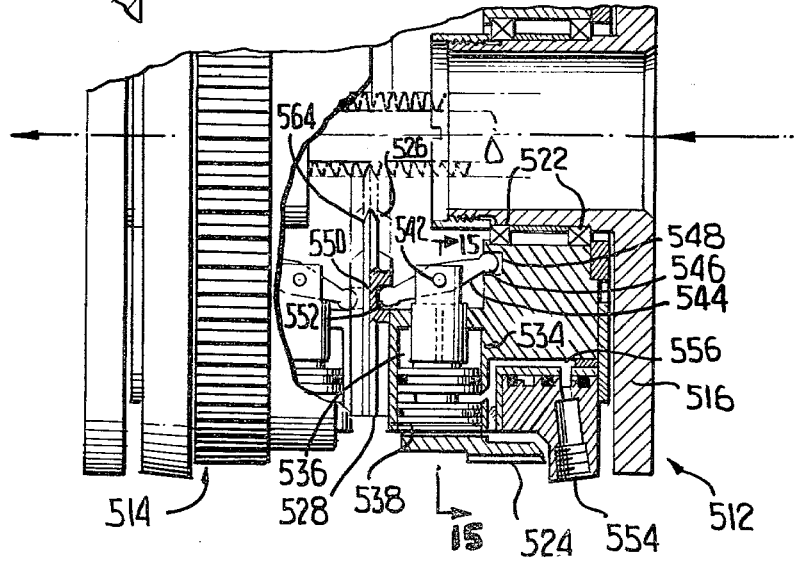

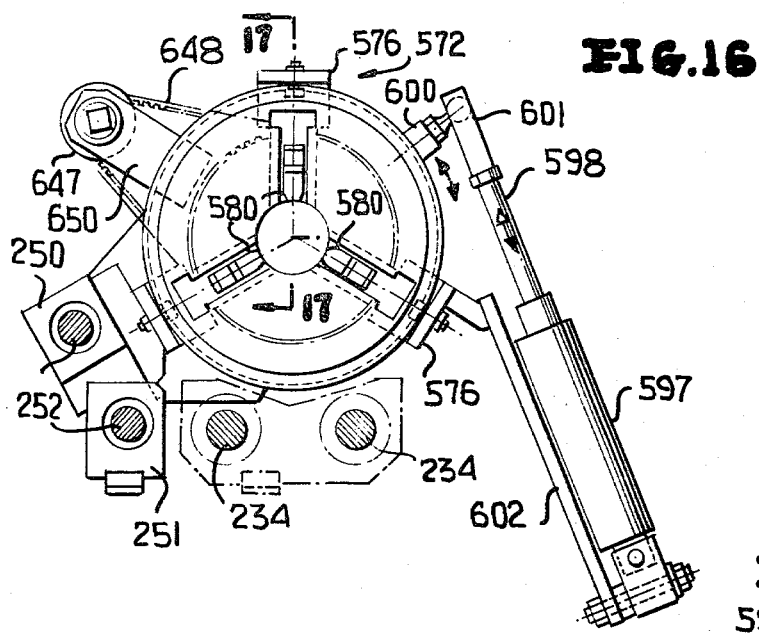
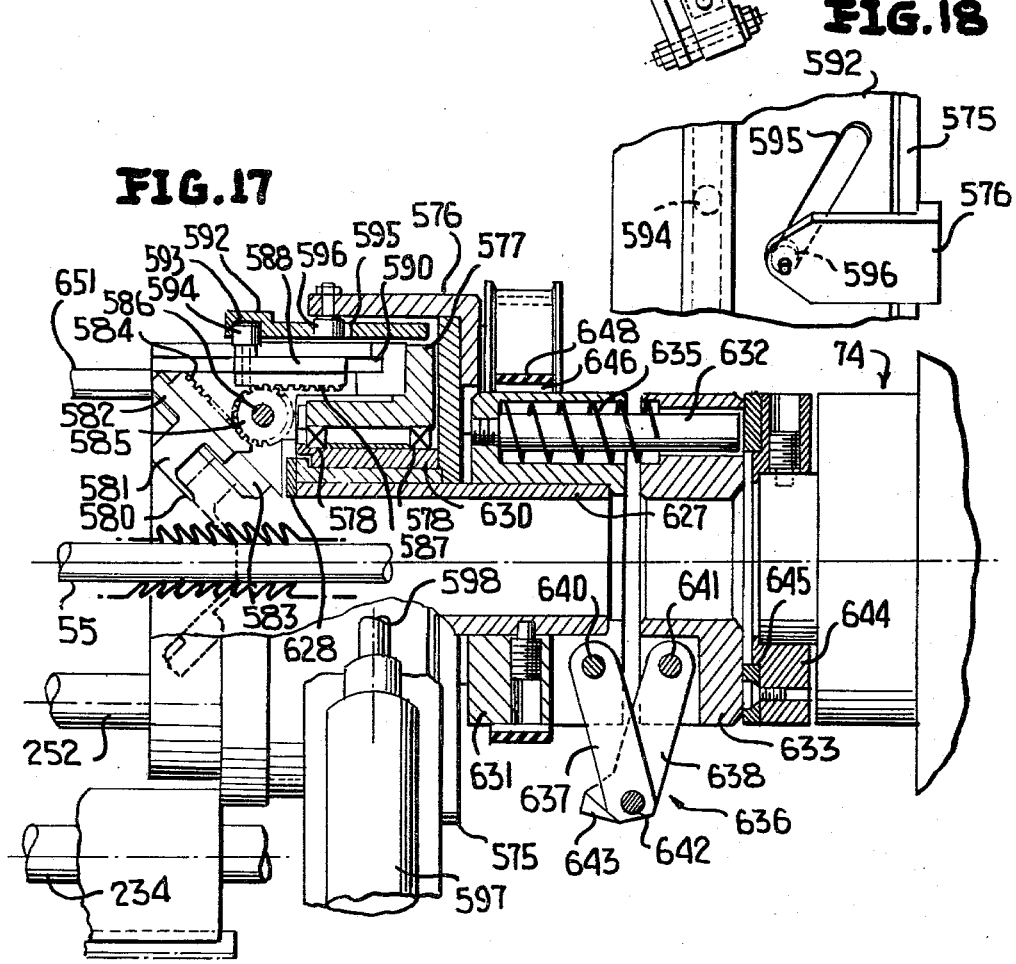

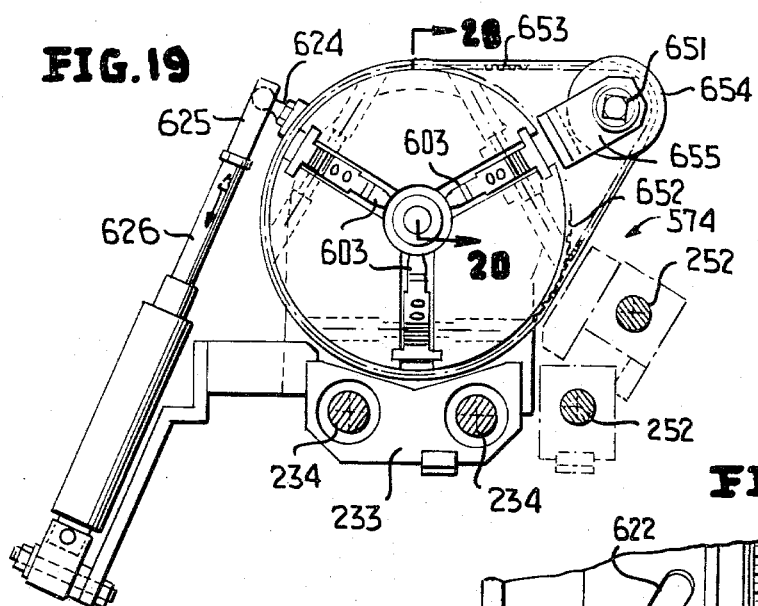
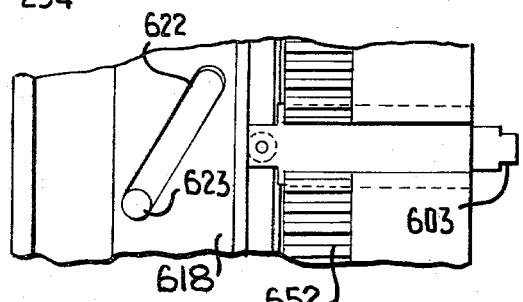
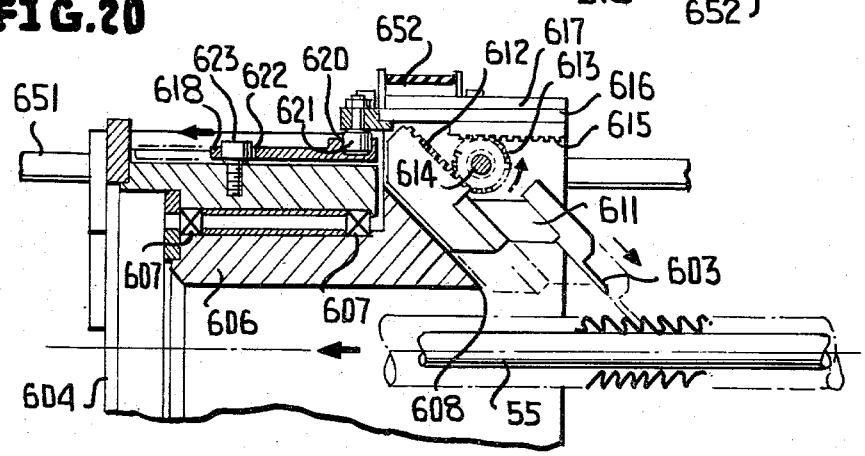

GRIPPER-SEPARATOR DEVICE FOR CONTINUOUSLY SHIRRED CASINGS

This invention relates in general to new and useful improvements in the shirring of thin walled tubular casing and the like, and more particularly to an improved strand gripper and separator for separating shirred casing into strands.

In the past, it has been difficult to grip the shirred casing which is continuously moving along a mandrel upon which it is shirred and separate the shirred casing into strands of the desired length without de-shirring a portion of the strand or missing a separation. Some strands are caused to rotate as they are shirred by a shirr-spin density control module or other strands are caused to rotate a number of degrees in one direction and then in a reverse direction for a number of degrees so as to cancel spin the casing being produced.

In accordance with this invention, it is proposed to provide a gripper-separator which will follow the rotation of the shirred casing as it is rotated or as it is reverse spun so that there will not be relative rotational movement between the gripper-separator as it functions to separate a continuous shirred casing into individual strands.

In accordance with this invention, a separate gripper and separator are provided, and each is fitted with a plurality of blades which may be projected in timed relation to the shirring of the casing so as firmly to grip the shirred casing and to move therewith. While the gripper travels only with the shirred casing, the separator is moved at a rapid rate so as to snap the shirred casing between the two sets of blades.

The blades of the gripper and separator may be projected by ways of varying mechanisms including fluid cylinders directly moving supports for the blades, fluid cylinders moving supports for the blades by a leverage linkage, and cam actuated rack and pinion drives.

The blades of the gripper and separator may either be positioned for movement at a 45° or like angle into engagement with the shirred casing, or the blades may be in face-to-face opposed relation.

A specific feature of the invention is to assure the simultaneous rotation of both the gripper and the separator so that the blades of the gripper and separator remain in preselected circumferentially spaced relation.

With the above and other objects in view that will hereinafter appear, the nature of the invention will be more clearly understood by reference to the following detailed description, and appended claims, and the several views illustrated in the accompanying drawings.

IN THE DRAWINGS

FIGS. 1A and 1B are side elevational view of the continuous casing shirring machine showing the general details thereof.

FIG. 2 is a schematic fragmentary sectional view taken through the strand separator, and shows the relative positions of a hold back unit and a separator unit.

FIG. 3 is an enlarged end elevational view of the separator unit.

FIG. 4 is an enlarged fragmentary sectional view taken generally along the line 4—4 of FIG. 3, and shows the details of the mounting of one of the fingers of the separator unit.

FIG. 5 is an end elevational view of a hold back unit.

FIG. 6 is an enlarged fragmentary sectional view taken generally along the line 6—6 of FIG. 5, and shows the details of the mounting of one of the hold back fingers of the hold back unit. FIG. 7 is a fragmentary sectional view taken generally along the line 7—7 of FIG. 6, and shows generally the details of the mounting of the finger and the piston for positioning the same.

FIG. 8 is a sectional view taken generally along the line 8—8 of FIG. 6, and shows further the details of the means for positioning the finger.

FIG. 9 is a side elevational view of the base portion of the strand separator, and shows the details of the drive mechanisms for reciprocating the separator unit and the hold back unit in sequence.

FIG. 10 is a transverse vertical sectional view taken generally along the line 10—10 of FIG. 9, and shows more specifically the details of the drive.

FIG. 11 is a longitudinal vertical sectional view taken along the line 11—11 of FIG. 10, and shows the specific details of the drive for the hold back unit.

FIG. 12 is a fragmentary elevational view of still another form of gripper-separator device.

FIG. 13 is a fragmentary vertical sectional view taken generally along the line 13—13 of FIG. 12, and shows the relationship of the blades of both the gripper and the separator and the actuating mechanism therefor.

FIG. 14 is a fragmentary vertical sectional view taken generally along the line 14—14 of FIG. 12, and shows the mounting of a typical blade.

FIG. 15 is a fragmentary transverse vertical sectional view showing the specific details of one of the fluid cylinders and the return means therefor.

FIG. 16 is a fragmentary transverse sectional view taken through the machine, and shows in elevation yet another form of gripper.

FIG. 17 is a fragmentary longitudinal vertical sectional view taken on the line 17—17 of FIG. 16, and shows specifically the details of the mounting of the blades and the means for advancing and retracting the blades.

FIG. 18 is a fragmentary elevational view showing the mounting of a cam member for actuating the blades.

FIG. 19 is a fragmentary transverse sectional view taken through the machine, and shows in elevation a separator which cooperates with the gripper of FIG. 16.

FIG. 20 is a fragmentary longitudinal vertical sectional view taken generally along the line 20—20 of FIG. 19, and shows the mounting of the blades of the separator and the means for advancing and retracting the same.

FIG. 21 is a fragmentary elevational view showing the manner in which a cam actuator for the blades is mounted.

Figure 1A:
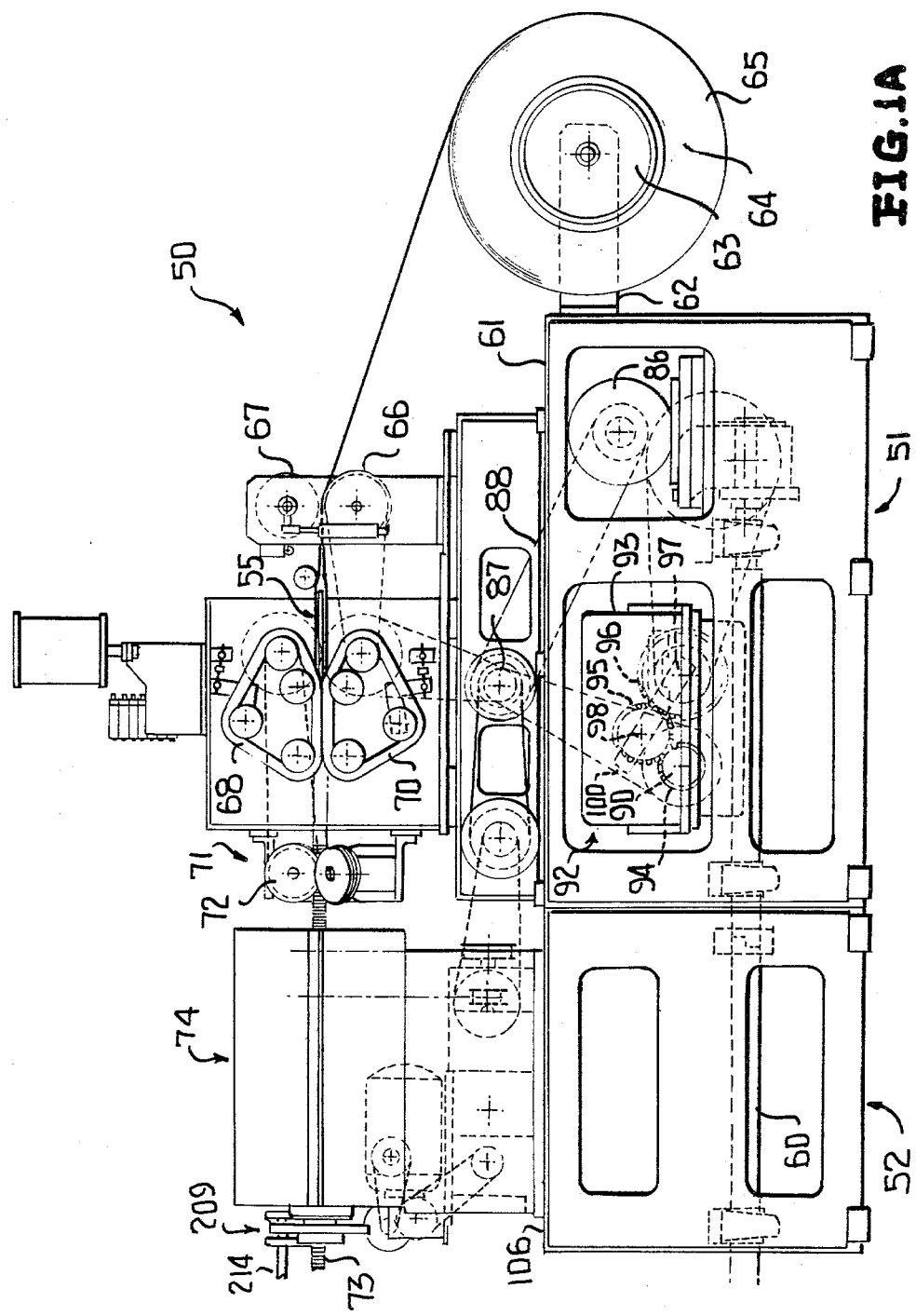

Referring now to the drawings in detail, reference is first made to FIGS. 1A and 1B wherein the general details of the continuous casing shirring and spinning machine are illustrated, the machine being generally identified by the numeral 50. The machine is formed of a plurality of replaceable units which include a casing feed and shirring unit 51 located at the head of the machine. Next, there is a combined shirred casing hold back and density control unit 52. This is followed by a casing separator unit 53 which receives the density controlled shirred casing and separates it into individual strands of regulated lengths. When desired, there is next an auxiliary hold back unit 54 which also carries clamp type supports for the mandrel in a manner to be described in detail hereinafter, the mandrel being generally identified by the numeral 55.

The next unit is a casing compresser and doffer unit generally identified by the numeral 56. This unit has associated therewith a combined strand handler and end closer unit 57.

Bridging generally between the units 53 and 56 is a transport device 58 for transporting a separated shirred casing strand from the casing separator device 53 into the combined casing compressor and doffer device 56.

All of the units are driven in timed relation under the control of a main drive shaft 60 which extends the length of the machine.

Referring specifically to FIG. 1A, it is to be understood that basically the unit 51 is conventional and forms no part of this invention. The unit 51 includes a mounting base 61 which has extending forwardly from the front end thereof a support 62 for a reel holder 63 which, in turn, is adapted to have received thereon a reel 64 of flat casing. The casing, 65, is in the form of a tubular film of collagen or cellulose which are extensively used as a sausage casing. The film is initially formed as a continuous tube and is rolled flat. The flat film is fed through a nip defined by a metering roll 66 and a back-up roll 67 onto the forward end of the mandrel 55 wherein it is automatically opened and is internally pressurized by a combined air spray and lubricant or softening fluid spray.

The opened casing 65 is then fed along the mandrel 55 at a controlled rate by a pair of opposed drive belts 68, 70 in a conventional manner. The casing 65 next passes through a shirring head 71 which includes a plurality of conventional shirring wheels 72 which radially inwardly fold or shirr the casing so that many feet of the casing may be compressed into a relatively short space. For example, eighty feet of casing may eventually be compressed into a stick or strand having a length on the order of thirteen inches.

The shirred casing, identified by the numeral 73, then passes into a combined casing hold back and density control device 74 which is part of the density control unit 52. The device 74 receives the shirred casing and permits the shirred casing to be advanced at the same rate as it is shirred by the shirring head 71. The device 74 is also mounted for rotation about the axis of the mandrel so as to impart a spin to the shirred casing 73 as desired. The density control device 74 may be selectively rotated in opposite directions either continuously or alternately so as either continuously to spin the casing in a selected direction or first to spin the casing in one direction and then in the opposite direction so as effectively to cancel the spin in the overall length of the casing.

Referring now to FIG. 1B, the density controlled shirred casing is directed to the unit 53 which at timed intervals is operated to grip an intermediate portion of the shirred casing with one set of fingers holding back the casing and the other advancing the casing to tear off or segregate a leading portion of the casing into individual sticks or strands of controlled length.

At this time it is pointed out that while the mandrel 55 is generally supported at spaced intervals along its length by various components of the machine 50, there are two sets of mandrel support clamp assemblies 75 and 76. The mandrel support clamp assemblies 75 and 76 serve to introduce into the mandrel 55 in a known manner separate streams of air and lubricating or casing softening liquids. One of the support clamp assemblies 75 and 76 remains closed at all times and is separately openable to permit a separated casing strand to be advanced along the mandrel 55 to the device 56 for first compressing the strand and then doffing the strand from the tail end of the mandrel.

The auxiliary hold back device 54, when utilized, engages the advancing end of the shirred casing 73 and cooperates with the combined casing hold back and separator device 53 to maintain the density of the shirred casing.

When a casing strand is separated, it is engaged by the transporter 58 and transported first to an intermediate position between the mandrel support clamps 75, 76 and then through the mandrel support clamp 76 and a head of the shirred casing compresser and doffer unit 56 for an operation thereon by the device 56.

The combined casing compresser and doffer unit 56 includes a travelling head 77 which, in association with an openable stop assembly 78 first functions to compress a casing strand and then to doff the casing strand from the mandrel 55 and deliver it to the strand holder and closer unit 57.

It is to be understood that with the mandrel support clamp 75 open and the mandrel support clamp 76 closed, the shirred casing 73 is advanced through the combined casing hold back and separator device 53 and a preselected length of the shirred casing has passed through the device 53. At this time, when the auxiliary hold back device 54 is used, a hold back head 80 of the auxiliary hold back device 54 will generally surround the mandrel 55 and permit the leading end of the shirred strand 73 to be advanced at the same rate as it is permitted to be advanced by the density control device 52.

At a controlled time, the head 80 will open and also begin rapidly to retract. At the same time the shirred casing will be gripped and held back by a hold back unit 81 of the device 53 while in the same plane as the unit 81 the shirred casing is also engaged by a separator unit 82 of the device 53. For a short period of time the units 81, 82 will be moved in unison, after which the unit 82 will be rapidly advanced to pull apart an intermediate portion of the shirred casing 73 and to be able to separate from the continuously shirred casing a strand or stick 83. The separator unit then returns to its position adjacent the hold back unit 81, leaving the separated strand 83 advanced on the mandrel 55. The mandrel 55 is then loosely engaged by a pusher element 84 of the transporter 58 and the separated strand 83 moved to a position intermediate the mandrel support clamps 75, 76. At this time the support clamp assembly 75 closes, followed by the opening of the support clamp assembly 76 so that the casing strand 83 may again be transported along the mandrel 55.

Following the separation of the strand 83, the hold back unit 81 continues to engage the leading end of the shirred casing and cooperates with the density control device 74 to maintain the controlled density of the shirred casing.

The auxiliary hold back device, when utilized, next advances the head 80 thereof to engage the leading end of the shirred casing and the hold back unit 81 releases the leading end of the shirred casing so that the shirred casing may now pass through both the hold back unit 81 and the separator unit 82 under the control of the auxiliary hold back unit 54.

In the meantime, the casing strand 83 is being operated on by the combined casing compresser and doffer unit 56. The stop 78 is closed and the head 77 engages the trailing end of the separated casing strand 83 and serves to compress the strand to the desired length. For example, the strand of controlled density may have had a length on the order of twenty-five inches when initially separated from the following shirred strand portion and is compressed to a length on the order of thirteen inches.

If desired, while the strand is being compressed, the head 77 may be oscillated or rotated about the mandrel 55 to shape the trailing end of the strand 83 to repair any minor deformation which may have occurred during the separation of the strand.

The stop 78 is then opened and the head 77 is further moved along the mandrel to doff the compressed strand 83 from the mandrel 55. The doffed strand is then received by a strand handler and closer 57 which laterally shifts the compressed strand into alignment with an end closer which is conventional, and thereafter deposit the closed strand in a receiving tray 85.

It is to be understood that the machine 50 is adjustable to receive tubular films of different diameters and different materials. Further, it is to be understood that the machine 50 is intended to supply strands of different lengths containing different footage of casing. Accordingly, it is necessary that the drive for the machine be adjustable. With reference to FIG. 1A, it will be seen that the machine 50 includes a primary drive motor 86 which drives a shaft 87 by means of a drive chain or belt 88. There is driven from the shaft 87, among other components, the shaft 60. In order to accomplish this, there is a shaft 90 which is driven from the shaft 87 by means of a drive belt or chain 91 and the shaft 90 constitutes the input for a quick change gear unit generally identified by the numeral 92. The quick change gear unit 92 includes a readily openable housing 93 into which the shaft 90 extends. The shaft carries a gear 94 with which there is meshed an intermediate gear 95 which, in turn, is meshed with a gear 96 carried by an output shaft 97. The intermediate gear 95 is carried by a shaft 98 which, in turn, is adjustable on a support 100.

The gear 94 is replaceable to change the drive ratio between the shaft 90 and the shaft 97 and the shaft 98 is shifted in accordance with the selected gear diameter so that the gear 95 will mesh with the new gear 94.

The shaft 97 extends transversely of the machine 50, and is provided adjacent its opposite end with a drive belt connection 101 to a reduction gear drive unit 103. The reduction gear drive unit 103 is coupled to the forward end of the control shaft 60 for effecting the rotation thereof at a greatly reduced speed. It is to be understood that the control shaft 60 is preferably rotated one revolution for each operating cycle of the machine 50. That is, for each revolution of the shaft 60 there will be formed one shirred casing strand.

Referring once again to FIG. 1A, it will be seen that the drive feed measuring roll 66, the feed belts 68, 70 and the shirring head 71 is taken from the shaft 87 in a conventional manner and that the rotational speed of the shaft 60 is varied by way of the quick change gear box 92 without changing the efficient operation of the casing feed and the shirring head.

The rotation of the spinning and density control unit 74 to effect the spinning of the shirred casing requires a like rotation of any subsequent equipment which will become fixedly engaged with the spinning shirred casing. To this end there is provided an auxiliary drive 209 from the unit 74 which includes a drive shaft 214 which is rotated in response to spinning of the unit 74.

It is to be noted that the drive shaft 214 is preferably of a non-circular cross section so that other elements driven thereby may have a sliding connection therewith. For simplicity, the drive shaft 214 is square in cross section, although it may be of other configuration.

The shirred casing is separated into strands of predetermined lengths by a separator or cutoff device which includes a hold back unit 81 and a separator unit 82. Each of these units has gripping fingers which will engage the spinning shirred casing in fixed relation, and it is therefore necessary that each of the units 81, 82 be driven at the same rotational speed as the unit 74. Accordingly, the hold back unit 81 is provided with a fixed housing portion 217 and a rotating housing portion 218. The fixed housing portion 217 carries a bracket 220 in which there is rotatably journalled a hollow shaft 221 which is slidable on the square drive shaft 214. The shaft 221 carries a sprocket 222 which is aligned with a sprocket 223 on the housing portion 218 and is coupled thereto in driving relation by a drive belt 224.

In a like manner, the separator unit 82 includes a fixed housing portion 225 and a rotatable housing portion 226. The fixed housing portion 225 carries a bracket 227 which is in sliding driven engagement with the square shaft 214. The shaft 228 carries a sprocket 230 which is aligned with a sprocket 231 on a rotatable housing portion 226 and is drivingly coupled thereto by a drive belt 232.

It will be seen that the driving arrangement is such that the units 81 and 82 may be moved longitudinally of the machine independently of one another and still be rotated at the same speed as is the frame 113.

Reference is now made to FIGS. 2–8 wherein further details of the combination separator and shirred casing gripper 53 are illustrated. Most particularly, reference is first made to FIGS. 3 and 4 wherein there are illustrated the details of the separator unit 82. As previously described, the separator unit 82 includes a fixed housing portion 225 which carries a rotatable housing portion 226. The fixed housing portion 225 carries a support bracket 233 which, as is best shown in FIG. 3, is mounted on a pair of guide rods 234. The support bracket 233 further carries a rack 235 for effecting the reciprocation of the separator unit 82 in a manner to be described hereinafter.

The bracket 227 extends up and to the right from the fixed housing portion 225, as is also shown in FIG. 3, so that the separator unit 82 may slide along the square drive shaft 214 and still be driven thereby.

As is best shown in FIG. 4, the rotatable housing portion 226 is mounted for rotation on the fixed housing portion 225 by means of bearings 236. The fixed housing portion 225 and the rotatable housing portion 226 have aligned central openings therethrough in which there is positioned the mandrel 55 and wherein there is sufficient clearance for shirred casing of the maximum size which is intended to be accommodated by the machine.

The separator unit 82 is provided with a plurality of circumferentially spaced shirred casing gripper fingers 237 which slope downwardly and to the right toward the direction of casing advance and terminate in blades. In the illustrated embodiment of the invention there are three such fingers 237.

Each finger 237 is suitably guided in the housing portion 226 and is carried by a piston extension 238 of a piston 240. The piston 240 is mounted within a cylinder 241 with the piston and cylinder being of the single acting type.

As is clearly shown in FIG. 4, the rotatable housing portion 226 carries a fluid supply ring 242 which is fixed against rotation by suitable attachment to the support bracket 223. The fluid supply ring 242 is sealed to the periphery of the rotatable housing portion 226 by way of suitable seals 243 and in combination with the periphery of the rotatable housing portion 226 defines an annular fluid supply passage 224 into which a supply port 245 opens. The rotatable housing portion 226 is provided with a supply passage 246 for each of the cylinders 241.

Each finger 237 is constantly urged toward retracted position by a pair of tension springs 247 which extend between a guide member 248 and the rotatable housing portion 226 with the guide member 248 being disposed between the finger and the piston extension 238.

Reference is now made to FIGS. 5-8 wherein the specific details of the hold back unit 81 are illustrated. The fixed housing portion 247 is provided with a pair of support brackets 250, 251 which are mounted on a pair of guide rods 252, 253. Further, the support bracket 251 carries a rack 254 for effecting the reciprocation of the hold back unit 81 in a manner to be described in detail hereinafter.

Referring now particularly to FIG. 6, it will be seen that the fixed housing portion 217 carries a pair of bearings 255 which mount the rotatable housing portion 217 for relative rotation. It will also be seen that the fixed housing portion 217 and the rotatable housing portion 218 have aligned central openings through which the mandrel 55 passes with the openings being of sufficient size to accommodate the maximum diameter shirred casing for which the machine is intended.

The rotatable housing portion is provided with a plurality of cylinders 256 which are circumferentially spaced and which have mounted therein pistons 257 provided with extensions 258. Adjacent each cylinder 256 there is a casing gripping finger 260 which terminates in a blade and is carried by a guide 261 which is slidably mounted within the rotatable housing portion 218 adjacent a respective cylinder 256. Each guide member 261 is attached to the piston extension 258 by a fitting 262. Further, attached to the fitting 262 are tension springs 263 which are anchored relative to the rotatable housing portion 218 and serve to return the fingers 260 to retracted positions. The mounting of the springs 263 is best shown in FIG. 20 wherein the springs are illustrated as being positioned within bores 264 and being anchored relative to the rotatable housing portion 218 by a wire clip 265.

The rotatable housing portion 218 carries a fluid supply ring 266 on its periphery adjacent the sprocket 223, as is best shown in FIG. 6. The fluid supply ring 266 is configurated on its inner surface to define an annular fluid passage 267 which is disposed next to the peripheral surface of the rotatable housing portion 218 between two seals 268. The supply ring 266 also is provided with a supply port 270 which opens into the passage 267.

The rotatable housing portion 218 is provided with a fluid passage 271 and each of the cylinders 256 with the fluid supply passages 271 opening through the periphery of the rotatable housing portion 218 in alignment with the annular passage 267.

Referring back to FIG. 2, it will be seen that immediately prior to the separation of the casing strand 83 from the shirred casing 73 the fingers 280 are gripping the shirred casing 73 in a holding back manner while the fingers 237 are engaging the shirred casing immediately circumferentially adjacent that portion engaged by the fingers 260. Then, while holding of the hold back unit 81 to a movement corresponding to the rate of advance of the shirred casing 73 and rapidly moving the separator unit 82 to the left, as shown in FIG. 2, there will be a sharp tensional force applied against the stirred casing between the two sets of fingers with the result that the shirred casing will rupture and tear circumferentially so as to separate without undue damage to either end of the separated shirred casing.

It is to be understood that the combined casing hold back and separator unit 53 is mounted on a rigid base 272 which is positioned next adjacent a rigid housing 106 for the unit 74 and is suitably fixed relative thereto. The base 272 carries a machinery housing 273. The guide rods 234, 252 and 253 are suitably mounted on the machinery housing 273 by means of suitable brackets which in and of themselves form no part of this invention.

Within the machinery housing 273 are separate drive systems for effecting the reciprocation of the racks 235 and 254. These two drive systems are of a similar nature but will be separately described.

First of all, there is a common drive shaft 274 for the two drive systems, the shaft 274 extending transversely of the machinery housing and being suitably journalled within bearings 275, 276 mounted therein. The drive shaft 274 carries a sprocket 277 which is driven by a drive chain 278 from the drive for the auxiliary hold back device 54.

The drive system for the rack 235 includes a plurality of shafts 280 which are mounted within bearings 281. Each shaft 280 carries a pinion 282 which is in position to be meshed with the associated rack 235. At this time it is pointed out that the mounting of each pinion 282 relative to the shaft 280 is one wherein the pinion may be angularly adjusted relative to the shaft.

Each shaft 280 also carries a drive pinion 283. As is best shown in FIG. 9, the drive pinions 283 are spaced and are drivingly interconnected by intermediate pinions 284 which are carried on stub shafts 285 and 286. Thus, all of the pinions 282 are rotated in unison. As is apparent from FIG. 9, the length of the rack 235 is much shorter than the stroke or linear movement thereof. Thus, the rack 235, as it shifts longitudinally of the machine housing 273, is sequentially engaged by the pinions 282 to have a very long effective stroke. The stroke of the rack 235 is greatly in excess of its length and this stroke is made possible by the plurality of pinions 282 and the mounting thereof so that they are in adjusted coordinated relation with respect to the rack so that there is no binding even when the rack is engaged simultaneously by two pinions 282.

The pinions 282 are driven through the shaft 286 and the intermediate gear 284 carried thereby. The shaft 286 extends to the exterior of the machine housing 273 and has mounted thereon a drive pinion 287 which is engaged by a drive rack 288. The drive rack 288 is carried by an elongated arm 290 which is mounted on a pivot shaft 291 for oscillation.

The arm 290 carries a cam follower 292 which engages a cam 293 carried by one end of the shaft 274. In order that the cam follower 292 may be constantly engaged with the cam, the arm 290 is in the form of a crank and has a second arm 294 to which there is connected an extensible fluid motor 295 which constantly urges the cam follower 292 against the cam 293 under a controlled pressure.

It is to be understood that for each complete rotation of the cam 293 there is a complete reciprocatory cycle of the rack 235.

The second drive system, which controls the position of the rack 254, is similar to the drive system for the rack 235 but differs therefrom primarily in that there are only two pinions 296. The pinions 296 are mounted on stub shafts 297 carried by bearings 298. Each shaft 297 also carries a drive pinion 300. It is to be understood that the pinions 296 are angularly adjustably mounted on their respective shafts 297.

With reference to FIG. 11, it will be seen that the drive pinions 300 are drivingly interconnected by an intermediate gear 301 which is carried by a stub shaft 302. The stub shaft 302 extends externally of the machine housing 273 and carries a drive gear 303 which is meshed with a rack 304. The rack 304 is carried by one arm 305 of a crank arrangement. The arm 305 carries a cam follower 306 which engages a cam 307 carried by the shaft 274. The arm 305 is constantly urged toward the cam 307 by way of an extensible fluid motor 308 engaged with a second arm 310 of the lever arrangement of which the arm 305 is a part.

It is to be understood that the rack 254 is also relatively short as compared to the desired stroke thereof and that it is transferred from one pinion 296 to the other with there being an intermediate position where the rack 254 is being simultaneously driven by both pinions 296. It is also to be understood that the complete reciprocatory cycle of the rack 254 is effected in a single revolution of the cam 307.

Referring now to FIGS. 12-15, there is illustrated a modified form of gripper-separator unit generally identified by the numeral 510. The unit 510 includes a gripper 512 and a separator 514. The gripper or hold back device 512 will be carried by suitable mounting brackets, such as the mounting brackets 250, 251, which will be carried by guide rods 252 and 253 as described with respect to the hold back device 81. In a like manner, the separator 514 will be carried by a mounting bracket such as the mounting bracket 233 for the separator 82, the mounting bracket being mounted on guide rods 234.

Referring now to FIG. 13, it will be seen that the gripper 512 includes a support member 516 which is secured to the mounting brackets 250, 251 and which carries a rotatable member 518 which is journalled on an internal sleeve member 520 by way of bearings 522. The rotatable member 518 is provided with a toothed sprocket 524 so as to be rotatable by way of a drive belt in a manner disclosed with respect to the gripper 81.

Unlike the gripper 81, which has only three blades, the gripper 512 has four blades 526 which are integral with carrier portions 528 that are mounted in a pair of guideways 530 seated in a recess 532 in a front face of the member 518.

Each blade 526 is actuated by an extensible motor which, in the illustrated embodiment of the invention, is in the form of a fluid cylinder arrangement 534. Each fluid cylinder arrangement 534 includes a cylinder 536 having a piston 538 mounted therein. Each piston is provided with a piston rod 540 which has a bifurcated inner end, as is best shown in FIG. 15. A pin 542 extends transversely of the bifurcation and pivotally mounts an intermediate portion of a lever 544. The lever 544 has one rounded end 546 positioned in a notch 548 in the member 518 and a second rounded end 550 positioned in a notch 552 in the support portion 528. It will be seen that for a unit travel of the piston rod 540 there will be double the movement of the blade 526.

The cylinders 536 will all receive air or other actuating fluid by way of a fitting 554 and through a rotary joint 556.

Referring once again to FIG. 15, it will be seen that the pivot pin 542 extends well beyond the piston rod 540 and has the remote ends thereof aligned with bores 558 in the member 518 alongside the cylinder 536. Each of the bores 558 has a tension spring 560 positioned therein with the inner end of each tension spring being interlocked with a respective end of the pivot pin 542 and the outer end of each tension spring being retained in place by a pin 562.

It is to be understood that the separator 514 will be of an identical construction to that of the gripper 512 as far as the mounting of the blades, etc., is concerned. However, for identification purposes the blades of the separator will be identified by the numeral 564.

As is best shown in FIG. 13, when there are four blades 526 and four blades 564, it is not possible that the blades interlock and be exactly in the same plane. However, by tapering the blades 526 and 564 and having the edges of the blades immediately adjacent one another, it will be seen that the blades may grip a shirred casing either in the same fold or in immediately adjacent folds so that the unit 510 may function in the same manner as the unit 53. It is to be understood that the gripper 512 and the separator 514 will be driven by the shaft 214 to rotate in unison and with any apparatus which may be used to spin the shirred casing.

Reference is now made to FIGS. 16-21 wherein there is illustrated still another form of gripper-separator unit, generally identified by the number 570. The unit 570 includes a gripper 572 and a separator 574.

Referring first to FIG. 16, it will be seen that the gripper 572 is carried by the mounting brackets 250, 251 which are slidably mounted on the guide rods 252,253. In a like manner, as is shown in FIG. 19, the separator 574 is mounted on the mounting bracket 233 which is guidingly mounted on the guide rod 234.

The gripper 572 includes a back plate 575 which carries at three circumferentially spaced points angle brackets 576. One of the angle brackets 576 is fixedly secured to the bracket 250, as is best shown in FIG. 16, and mounts the back plate for movement with the brackets 250, 251.

The back plate 575 carries a rotatable member 577 by way of bearings 578. The rotatable member 577, in turn, carries three sets of blades 580, the supports therefor, and the actuators therefor. Only one blade 580 will be specifically described here.

The blade 580 slopes downwardly and inwardly, as is clearly shown in FIG. 17, and is carried by a support 581 which, in turn, is carried by a guide member 582 which is mounted in a guideway 583 formed in the rotatable member 577.

The blade 580 is positioned by means of a rack 584 which is mounted by the guide member 582. The rack 584 is driven by means of a pinion 585 which is mounted on a shaft 586 and meshed with a rack 587. The rack 587 is mounted for axial movement on a guide 588 which, in turn, is mounted in a guideway 590 defined by a guide element 591 carried by the rotatable member 577.

A cam ring 592 extends around the exterior of the member 577 and has adjacent one end thereof an annular groove 593 which opens radially inwardly and has positioned therein cam followers 594, there being one cam follower 594 for each of the racks 587 with the cam follower being carried by a respective guide member 588.

The cam ring 592 is provided with circumferentially spaced cam slots 595 which are of a sloping configuration, as is best shown in FIG. 18. Each cam slot 595 has positioned therein a cam follower 596 which is carried by one of the angle brackets 576, as is best shown in FIGS. 17 and 18. It thus will be apparent that when the cam ring 592 is rotated relative to the back plate 575, it will be shifted axially and thus the cam followers 594 will shift the racks 597 axially so as to rotate the pinions 585 and shift the racks 584 and the associated blades 580 downwardly and inwardly so as to engage and grip shirred casing carried by the mandrel 55.

In order to effect the rotation of the cam ring 592, there is provided an extensible motor 597 having an actuating rod 598 which is secured to a projection 600 carried by the cam ring 592, the projection 600 has a ball and socket coupling 601 with the actuating rod 598. As is best shown in FIG. 16, the extensible motor 597 is carried by a bracket 602 which, in turn, is carried by one of the angle brackets 576.

Reference is now made to FIGS. 19–21 with respect to the separator 574. The separator 574 also carries three blades 603 which slope downwardly and inwardly parallel to the blades 580. Further, the blades 603 are intended to be intermeshed with the blades 580 so that the tips of the blades 580 and 603, in their projected casing engaging positions, will lie in a common plane.

As is best shown in FIG. 20, the separator 574 includes a fixed back plate 604 which, in turn, carries a fixed outer ring 605. A rotatable member 606 is rotatably journalled within the ring 605 by way of bearings 607. The rotatable member 606 has formed therein a guideway 608 with respect to each of the blades 603 and has mounted therein a guide member 610 which carries a bracket 611 mounting a respective blade 603. The guide member 610 carries a rack 612 which meshes with a pinion 613 mounted on a shaft 614. The pinion 613, in turn, meshes with a rack 615 carried by a guide member 616 which is also guidingly engaged in guideways 617 formed in the rotatable member 606.

A cam ring 618 generally extends around the ring 605 and has a radially outwardly opening annular cam groove 620 in which there is positioned a cam followed 621 carried by each of the guide members 616. The cam ring 618 also has formed therein circumferentially spaced cam grooves 622 which are of a sloping configuration as is best shown in FIG. 21. In each cam groove 622 there is a cam follower 623 which is fixedly carried by the ring 605.

Referring once again to FIG. 19, it will be seen that the cam ring 618 is provided with a radially outwardly directed fitting 624 which is coupled by way of a ball and socket fitting 625 to an actuator rod 626 of an extensible motor (not shown), which motor will be of a construction similar to the motor 597 and which will be mounted on a suitable bracket (not shown) fixedly secured to the mounting bracket 233.

It is to be understood that the gripper 572 and the separator 574 will be rotated in unison. The means for accomplishing this will be described in more detail hereinafter.

Referring now once again to FIG. 17, it will be seen that the back plate 575 carries an inner sleeve 627 which is provided at its left end with a face tooth drive connection 628 with the rotatable member 577. The sleeve 627 is guided within a sleeve 630 carried by the face plate 572.

The sleeve 627 carries a clutch body 631 which is provided with a plurality of guide pins 632 on which there is mounted for axial movement a clutch element 633 having an exposed clutch face 634 at the right end thereof. The clutch element is constantly urged to the right by compression springs 635 mounted on the guide pins 632.

In order that the projection of the clutch element 633 to the right from the clutch body 631 may be limited, there is provided at least one, and preferably several, scissor linkages generally identified by the numeral 636. Each scissor linkage includes a pair of cooperating links 637 and 638 mounted on pivot pins 640 and 641 carried by the clutch body and the clutch element, respectively. The links 627, 638 are pivotally connected by a pivot pin 642. The link 638 carries adjacent the pivot pin 642 a stop projection 643 which limits the pivoting of the links in an opening direction thus to limit the movement of the clutch element 633 to the right.

The combined density control and casing spinning device 74 or any other device which serves to spin the casing and is disposed next the gripper 572 is used to rotate the gripper 572 at the same speed and in the same direction as the shirred casing is being spun. To this end, the device 74 or like device is provided with a drive plate 644 which carries a clutch facing 645 which opposes the face 634 of the clutch element 633.

When a shirred casing is to be gripped and separated into an individual strand, the gripper 572 is retracted to the right to its casing gripping position, at which time the face 634 engages the clutch facing 645 and serves to rotate the inner sleeve 627 and thus the rotatable member 577 and the blades 580 carried thereby. The gripper continues to spin with the casing and at the same rate as the spinning of the casing until after a strand has been separated even though the gripper moves axially with the spinning casing a short distance. It will be seen that the provided for movement of the clutch element 633 permits the gripper to move on the order of one inch while it is still being driven by the clutch facing 645.

Inasmuch as the blades 580 and 603 intermesh and are disposed in circumferentially alternating relation, it is necessary that the separator 574 also be rotated in unison with the gripper 572. Accordingly, suitable means must be provided for rotating the separator in unison with the gripper.

While any desired coupling may be provided, in accordance with this invention the clutch body 631 may be provided with a toothed sprocket 646 which will be coupled to a drive sprocket 647 by way of a belt 648 in the same manner as that described with respect to the hold back device or gripper 81. The sprocket 647 will be mounted for rotation in a suitable bracket 650 carried by the back plate 575 and will have a square opening therein to carry a square drive shaft 651. It is to be understood that the drive shaft 651 will be longitudinally fixed relative to the sprocket 647.

In a like manner, the rotatable member 606 may be provided with a toothed drive sprocket 652 which will be driven by a drive belt 653 (FIG. 19) which engages a drive sprocket 654 mounted in a suitable bracket 655 carried by the back plate 604. The sprocket 605 will have a square opening therethrough and will have the square drive shaft 651 extending therethrough. It is to be understood that the shaft 651 will be of a sufficient length to permit the independent movement of the separator 574 relative to the gripper 572 to effect the separation of shirred casing into a strand and to move the strand along the mandrel 55 a sufficient distance for engagement by a transporter.

It is to be understood that the gripper 572 and the separator 574 will be axially moved in the manner described hereinabove with respect to the gripper 81 and the separator 82.

Although only several preferred embodiments of the gripper and separator devices have been specifically illustrated and described herein, it is to be understood that minor variations may be made therein without departing from the spirit and scope of the invention.

Referring once again to FIGS. 5 and 6, it will be seen that the positioning of all of the fingers 260 simultaneously may be effected by means of a timing disc 660. The timing disc 660 is annular in outline and is provided with a series of arcuate cam slots 661, there being one cam slot for each of the fingers 260. A follower member 662 in the form of a shoulder bolt extends through each cam slot 661 and is engaged in the respective finger 260.

It will be apparent that when the fingers 260 are advanced or retracted, the disc 660 will rotate and will either be held up or cause the fingers to move in the desired direction, thereby providing for a uniform movement of the various fingers 260.

Although only the hold back device or gripper 81 has been illustrated with the timing disc 660, it is to be understood that the timing disc may equally as well as utilized in connection with the separator 82 and the gripper 512 and the separator 514.

What is claimed as new is:

1. In a machine for continuously shirring casings of the type having a fixed mandrel along which the shirred casing is continuously advanced, a segregator for segregating a continuously shirred casing into separate strands, said segregator comprising a gripper unit and a separator unit, means mounting said gripper unit and said separator unit for selected individual movement longitudinally along said mandrel, each of said units including gripper means for engaging an intermediate portion of a shirred casing, control means for separately actuating said gripper means of said units, and drive means for separately moving said units longitudinally along said mandrel with said separator unit being movable away from said gripper unit while said gripper means of said units are engaged with an intermediate portion of a shirred casing to separate a leading portion of said shirred casing from the remainder thereof.

2. The machine of claim 1 wherein said shirred casing is being spun about said mandrel, and means for rotating said units about said mandrel at the same rate as the spinning of a shirred casing to be separated into shirred strands.

3. The machine of claim 1 wherein said drive means are separate rack and pinion drives for each of said units, and means for applying different motions to said racks.

4. The machine of claim 3 together with a control shaft for actuating said separate rack and pinion drives, and a separate actuator carried by said control shaft for each of said rack and pinion drives.

5. The machine of claim 4 wherein each of said actuators is a cam and said cams are of different configurations.

6. The machine of claim 3 wherein the motion of said gripper unit immediately prior to actuation of said separator unit to separate a shirred strand is along said mandrel at the same rate as shirred casing.

7. The machine of claim 1 wherein said gripper means includes separate gripper fingers and linear motors connected to said gripper fingers for positioning said gripper fingers.

8. The machine of claim 7 wherein said shirred casing is being spun about said mandrel, and means for rotating said units about said mandrel at the same rate as the spinning of a shirred casing to be separated into shirred strands, and a rotary coupling between said linear motors and a power supply for said linear motors.

9. The machine of claim 1 wherein said gripper means includes plural casing engaging fingers carried by each of said units, and all of said fingers having casing engaging portions lying substantially in the same plane when engaging a shirred casing to be separated.

10. The machine of claim 9 wherein said casing engaging portions are in the form of blades.

11. The machine of claim 9 wherein said fingers of said units are internested and in circumferentially alternating relation when said units are in a casing separating cooperating relation.

12. The machine of claim 9 wherein said fingers are in back-to-back relation.

13. The machine of claim 2 wherein there is a casing spinning device, and said means for rotating said units is driven from said casing spinning device.

14. The machine of claim 2 wherein there is a casing spinning device, and said means for rotating said units is driven from said casing spinning device with each unit being separately driven.

15. The machine of claim 2 wherein there is a casing spinning device, and said means for rotating said units is driven from said casing spinning device with said gripper unit being directly driven and said separator unit being driven from said gripper unit.

16. The machine of claim 2 wherein there is a casing spinning device, and said means for rotating said units is driven from said casing spinning device with said gripper unit being directly driven by a clutch unit.

17. The machine of claim 7 wherein said linear motors are directly connected to said fingers.

18. The machine of claim 7 wherein said linear motors are connected to said fingers by travel multiplying linkage.

19. The machine of claim 1 wherein said gripper means includes separate gripper fingers and cam actuated means connected to all fingers of each unit for positioning said fingers in unison.

20. The machine of claim 19 wherein said cam actuated means includes a cam ring mounted for rotation, cam means for axially shifting said cam ring in response to rotation of said cam ring and means for effecting controlled rotation of said cam ring.

21. The machine of claim 20 wherein separate rack and pinion drive means connects said cam ring to each associated ones of said fingers for shifting said fingers radially in response to axial movement of said cam ring.

22. The machine of claim 1 wherein said gripper means includes plural casing engaging fingers carried by each of said units, and timing means interconnecting all fingers of a respective unit for effecting actuation in unison.

23. The machine of claim 22 wherein said timing means include a timing disc and means securing said timing disc to each of said fingers.

24. The machine of claim 22 wherein said timing means include a timing disc having an arcuate timing slot therein for each finger, and a follower member extending through each timing slot and being carried by a respective finger.

* * * * *